July 10, 1956

N. CAPELLARO

2,754,052

FUGITIVE ONE AND OVERDRAFT CONTROL MECHANISM

Filed June 17, 1950

Inventor
Natale Capellaro
By Robert E. Burns
Attorney

July 10, 1956

N. CAPELLARO

2,754,052

FUGITIVE ONE AND OVERDRAFT CONTROL MECHANISM

Filed June 17, 1950

Inventor
Natale Capellaro
By Robert E. Burns
Attorney

July 10, 1956

N. CAPELLARO 2,754,052

FUGITIVE ONE AND OVERDRAFT CONTROL MECHANISM

Filed June 17, 1950

Inventor
Natale Capellaro
By Robert E. Burns
Attorney

United States Patent Office 2,754,052
Patented July 10, 1956

2,754,052

FUGITIVE ONE AND OVERDRAFT CONTROL MECHANISM

Natale Capellaro, Ivrea, Italy, assignor to Ing. C. Olivetti & C., S. p. A., Ivrea, Italy Application June 17, 1950, Serial No. 168,709

Claims priority, application Italy January 27, 1950

5 Claims. (Cl. 235—60)

The present invention relates to listing adding and subtracting machines, equipped with reciprocable actuating racks, more particularly to that type of machines upon which problems of division may be performed and which prints all the factors of such problems.

In the known machines, after having set up the dividend and the divisor and upon the depression of a proper key, the operation is accomplished perfectly automatically up to the printing of the quotient and the eventual remainder. In some machines the quotient is printed, one digit under another, by means of a special typecarrier, in others the printing of same occurs simultaneously for all of its digits on a horizontal line, by zeroing a proper revolution counter upon which the quotient has been gradually accumulated.

The present invention relates to both types of machines and it is the object of the invention to provide new and useful improvements in the mechanisms for accomplishing a division.

The method by which a division is performed in many computing machines, based upon the principle of repeated subtraction, is well known. The dividend is first entered into the register and then the divisor is set up on the keyboard and so positioned as to place the digit of the highest order of the divisor directly beneath the digit of the highest order of the dividend. Then the divisor is repeatedly subtracted out until the dividend is oversubtracted and the number which remains in the register becomes negative. The number of subtract cycles, less one, is equal to the first or highest digit of the quotient. This digit may be recorded either by means of the special typecarrier advancing one step for each subtract cycle and upon which the types are so disposed as to automatically correct the excessive subtract cycle, or by means of the revolution counter which accumulates the successive digits of the quotient, as well known in calculating machines. After a correcting cycle of addition the divisor backspaces one step and the operation is continued in a similar way until the whole problem has been worked out.

The setting of the machine for addition occurs automatically due to the signal transmitted to the operation control means when the register wheel of the highest order passes from Zero position to Nine, in an operation of subtraction, i. e. when the wheel effects a carry over.

In the adding machines equipped with automatic division of the kind described, and in particular in those provided with a special typecarrier for printing the digits of the quotient, the division key operates a control mechanism, which controls directly all the functions of the machine. Namely, after having set up the two factors, the depression of the division key starts the machine and brings the control mechanism into an active position in which the machine is immediately set for subtraction. Simultaneously the printing means are disabled and locked in an inactive position. When the dividend is oversubtracted after the series of repeated subtractions thus started, the register wheel of the highest order effects a carry-over and causes the return of the control mechanism to an inactive position. Therefore, during the following cycle the machine returns to its normal adding and printing position. Additional locking means are provided to keep the division key depressed, otherwise the machine would stop. At the end of the add cycle, during which the divisor in its initial position and the digit of the quotient corresponding to the preceding series of subtract cycles are printed, the divisor is spaced one step. During the same add cycle the control mechanism is automatically conditioned to return during the next following cycle to its active position. Therefore, the control mechanism stays, during one cycle only, in its inactive position so that the next following cycle will again be a subtract and not printing one. It results that the machine is again set for these functions without the necessity of a new signal, which could be given by the wheel of the highest order, when the divisor is added back into the register and the number therein contained returns positive.

Considering now that each excessive subtract cycle must be followed by at least two cycles—one of addition and one of subtraction—and also bearing in mind that during the first cycle the digit of the quotient must be printed and the divisor must be back spaced and that during the second cycle the printing mechanism must be disabled, it becomes evident that it is necessary to provide operation conditioning means and locking means which will still act after the end of the cycle in which they became effective. This results in a complicated mechanism of difficult construction.

Division mechanisms of this type present in reality a very large number of parts and are of very expensive construction.

One object of this invention is to provide a division mechanism working most simply, with a construction presenting a reduced number of parts and giving the greatest reliability.

In particular the mechanism is characterized in that at the start of each cycle the sign of the number accumulated in the register is sensed in order to condition all the operations which should be performed during the cycle.

The sensing is performed on the register wheel of the highest order, utilizing the means which in certain adding machines, equipped with reciprocable actuating racks, permit the obtaining of true negative totals or balances. It is of importance to remember here the basic working scheme of these machines.

The register comprises two sets of intermeshing wheels to wit the adding wheels, which are moved into mesh with the actuating racks during add cycles, and the subtracting wheels, which are moved into mesh with the actuating racks during subtract cycles. This disposition permits, as known, turning the adding wheels in one direction during add cycles and in the opposite direction during subtract cycles, keeping constant the direction of motion of the actuating racks, during their actuating stroke. It is therefore obvious that during each operation one of the two sets of wheels accumulates the figures in their true form, while the other accumulates them in their complementary form.

Each wheel has a transfer tooth for effecting the tens carry-over. But the adding wheel and the subtracting wheel of the highest order have a second transfer tooth, for the purpose of advancing one step the wheel of the lowest order when the register is overrun; this connection between the wheels of the highest and the lowest order is known as the "fugitive one" mechanism. At the same time the transfer tooth mentioned hereinbefore is utilized to constantly signalize the sign of the total contained by the register and this signal is normally used to automatically move into mesh with the actuating racks, in a total taking, the sets of wheels corresponding to the sign previously ascertained and in which the total is accumulated in its true form. When, by a total taking, this sign is a positive one, the adding wheels must be zeroized, and when it is a negative one, the subtracting wheels must be zeroized. It results, therefore, that it is possible to automatically print a negative total in its true form.

Returning to the sensing of the position of the wheel of the highest order, it is obvious that, there being two positions which the means associated with the wheel are adapted to assume—the one corresponding to a positive total and the other one to a negative total—and there being two types of operating cycles which must be performed during division—(1) subtract and nonprint cycle, (2) add, print and backspace cycle—the sensing of the sign made at the start of each cycle is sufficient to condition the type of operation to be performed during the same cycle.

Therefore, the action of the operation conditioning means and locking means which become effective at the start of the cycle ends during the same cycle, so that the whole mechanism becomes greatly simplified and with a more harmonious funcional scheme.

The division mechanism of the present invention also permits the machines to which it is applied, to obtain a true negative total. It is known that in adding machines, which have been equipped with a device for performing automatic division and which have one register, it is not possible to print a negative total in its true form. This arises from the working principle of the division and relates directly to the fugitive one mechanism. Indeed, if during the division the fugitive one mechanism remains effective, in the division with remainder zero a false result is obtained. This will be explained as follows:

Assume "four" is to be divided by "two." The dividend "four" is entered into the register during an add cycle, the divisor "two" is set up on the keyboard and the subtraction is started. During the first subtract cycle the subtracting wheel of the units passes from position "four" to position "two." During the second cycle the same wheel passes from "two" to "zero." Now it is to be borne in mind, that as known in the art, the transfer teeth of the adding wheels effect the carry over when passing from position "nine" to position "zero," while the transfer teeth of the subtracting wheels effect the carry over when passing from "zero" to "nine." Therefore, when the subtracting wheel of the unit passes from "zero" to "eight" during the third subtract cycle, the carry over is effected and repeated successively for all denominational orders of the register, and each wheel, beginning from that of the tens, passes from "zero" to "nine." Now, if the fugitive one mechanism is permitted to work, the wheel of the highest order passes from "zero" to "nine" and backspaces the wheel of the units one step, that is from position "eight" to position "seven." During the following add cycle, during which the divisor "two" is added back, the adding wheel of the units which, being in mesh with the corresponding subtracting wheel was in position "seven," passes to position "nine." It is thus evident that during this add cycle no carry over is effected and the wheel of the highest order remains inoperative without giving a signal. The absence of this in the known division mechanisms did not prevent the return of the machine to subtraction, this return having been conditioned in advance or, in this instance, the stopping of the machine, when the operation is finished. But in taking the total the remainder would appear to be equal to . . . 99999999. Therefore, it is clear that during the division the fugitive one mechanism has to be disengaged.

Another object of the present invention is to provide a division mechanism in which the division key, when depressed into its active position, automatically disengages the means which connect the wheel of the highest denominational order to that of the lowest order, enabling said connecting means to become effective, as soon as the division key is restored into its inactive position. In this way during all the other operations of the machine the fugitive one mechanism remains effective, permitting the printing of true negative totals while it is disabled during operations of division.

It has already been said that in some type of machines the quotient is printed, one digit under another, by means of a special typecarrier. The figure thus formed must be read from top to bottom, because the digit printed at the top is that of the highest order. If the operator forgets how he has to read the figure and is not aware of the method followed by the machine in performing division, he could get in trouble, not knowing if the figure is to be read from top to bottom or vice versa.

It would therefore be advisable to compel the operator in some way to automatically read the digits of the vertical column in the proper sequence.

Other objects of the invention will be apparent from the following description, which refers to the application of the present mechanism to a listing adding machine of the ten-key keyboard type. It is understood, of course, that the invention may be applied to any type of listing adding machine, also to full keyboard machines, provided that their register is actuated by reciprocating actuators. In the example described hereinafter the machine is equipped with an electromotor but the invention can also be applied to hand driven machines.

In the drawings:

Fig. 2 and Fig. 3 are left hand views of the tens carry-over mechanism. In Fig. 2 the positive set of register wheels (adding wheels) is shown in mesh with the actuating racks; in Fig. 3 the negative set of register wheels (subtracting wheels) is shown in position to mesh with the actuating racks.

Figure 1:
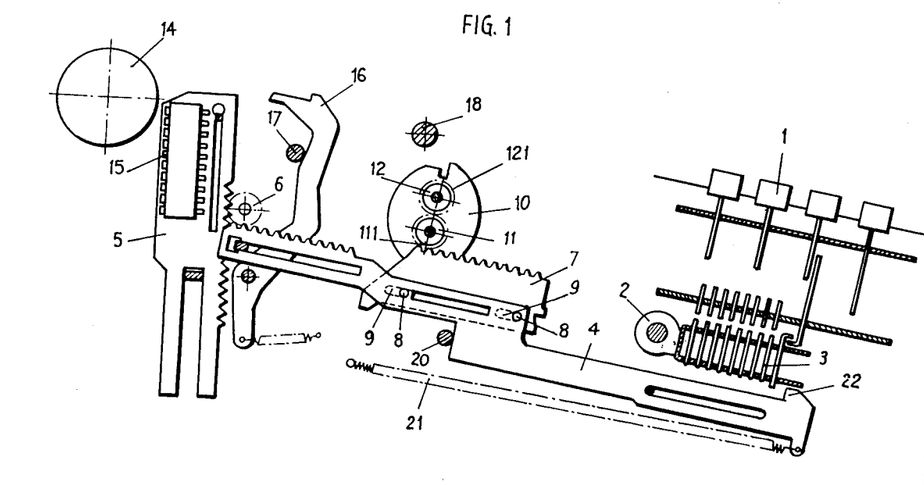
Figure 1 shows the basic scheme of a listing adding and subtracting machine of the ten-key keyboard type, in sectional left hand elevation.

Fig. 1 shows the basic scheme of a ten-key listing adding machine. The mode of operation of this machine is known in the art and will be summed up as follows.

The machine embodies the digit keys 1; the step by step moving pin carriage 2 having pins 3 adapted to be depressed by the keys 1; the actuating racks 4 in constant connection with the typebars 5 by means of pinions 6; the racks 7 associated with the racks 4 by means of pins 8 and slots 9, permitting the racks 7 to slide one step with respect to racks 4; the register group 10 embodying the adding wheels 11 and the subtracting wheels 12, the whole being capable of being rocked through 180° around the shaft 13 (Figure 8); the platen 14 in front of which the types 15 of the typebars 5 are brought into printing position; the hammers 16, adapted to strike the types 15 when released by the hammer restoring bail 17; and last the main operating shaft of the machine 18, which, by the motor (not shown in the drawings), rocks through 90 degrees forward and back at each machine stroke and controls the movement of all the parts of the latter.

In an add cycle, after having set up the addend, each rack 4 is freed by the bar 20 during the forward stroke of the shaft 18 and is drawn to the left by spring 21 until its tooth 22 is arrested by the pin 3 which has been lowered. At the same time the typebar 5 is raised, carrying the type corresponding to the stroke made by the rack 4 into printing position. At the end of the forward stroke the hammer restoring bail 17 releases the hammers 16, which print the addend set up. During the return stroke of the shaft 18 the racks 4 are restored to their normal position by the bar 20.

At the start of this stroke the register has been lowered and the adding wheels 11 moved into mesh with the racks 7; therefore, the wheels 11 accumulate the addend set up. In the case of a subtraction the register group 10 would have been previously reversed around the shaft 13 and the subtracting wheels 12 moved into mesh with the racks 7.

The relative advance of one step between the racks 4 and 7 is provided for the tens carry-over, which is effected by the transfer teeth 111 and 121 and the levers 23 and 24 (Fig. 2) as will be described hereinafter.

Now the division mechanism will be described as applied to a machine of the mentioned class.

The division key 31 (Fig. 8) is secured to a lever 32 formed with a tooth 33 and pivoted upon the shaft 34. In front of tooth 33 there is the lug 35, carried by a bail 36 pivoted upon the shaft 37. By depressing the division key 31 in the direction of the arrow, the lever 32 rocks clockwise and its tooth 33 slides upon the back of lug 35, causing the latter to be raised and the bail 36 to be swung clockwise about its pivot shaft 37, until the tooth 33 is engaged by the lug 35. The lever 32 and the bail 36 remain in their respective new positions until the end of the whole operation of division.

An arm 38 projects from bail 36 (Fig. 11), having a stud 39 adapted to abut against the edge 40 of the lever 41. This lever, when moved to the left, starts the motor by actuating suitable motor-starting mechanism as is well known in the art. When the bail 36 is swung clockwise the stud 39 slides along the edge 40 and pushes the lever 41 to the left, so that the motor is started.

The bail 36 is further provided with an arm 42 (Fig. 11) upon which rests the right hand end of lever 43 by action of spring 26; this lever is pivoted at 45 and is formed with a depending arm 44. In front of the arm 44 is the end of an arm of the plate 46, pivoted on a shaft 47 and having two further arms 48 and 49. By depressing the division key 31 (Fig. 8) the clockwise rotation of bail 36 (Figs. 8 and 11) causes the counter-clockwise rotation of lever 43, and therefore, its arm 44 clears the right hand arm of the plate 46, permitting the latter to rotate counter-clockwise when swung in that direction. The roller 50 is pivoted on the arm 48 of the plate 46. This roller 50 is capable of rolling upon the edge 51 of lever 52 mounted fast on the shaft 53 journalled in the frame of the machine. A spring 54 is stretched between plate 46 and the downwardly offset ear 55 of lever 52. A finger 57 extends upwardly from cam 56 mounted fast on the main operating shaft 18. The finger 57 engages the roller 50 during the forward stroke of the shaft 18.

A lever 58, formed with an upwardly extending finger 59, is pivoted upon the shaft 47 (Fig. 11) and is adapted to engage the bent-over lug 60 of lever 52. Lever 58 has an inclined edge 61 engageable by a stud 62 secured to cam 56. The lever is urged counter-clockwise by a spring 63, which is of lesser strength than the spring 54.

Figures 11, 14:
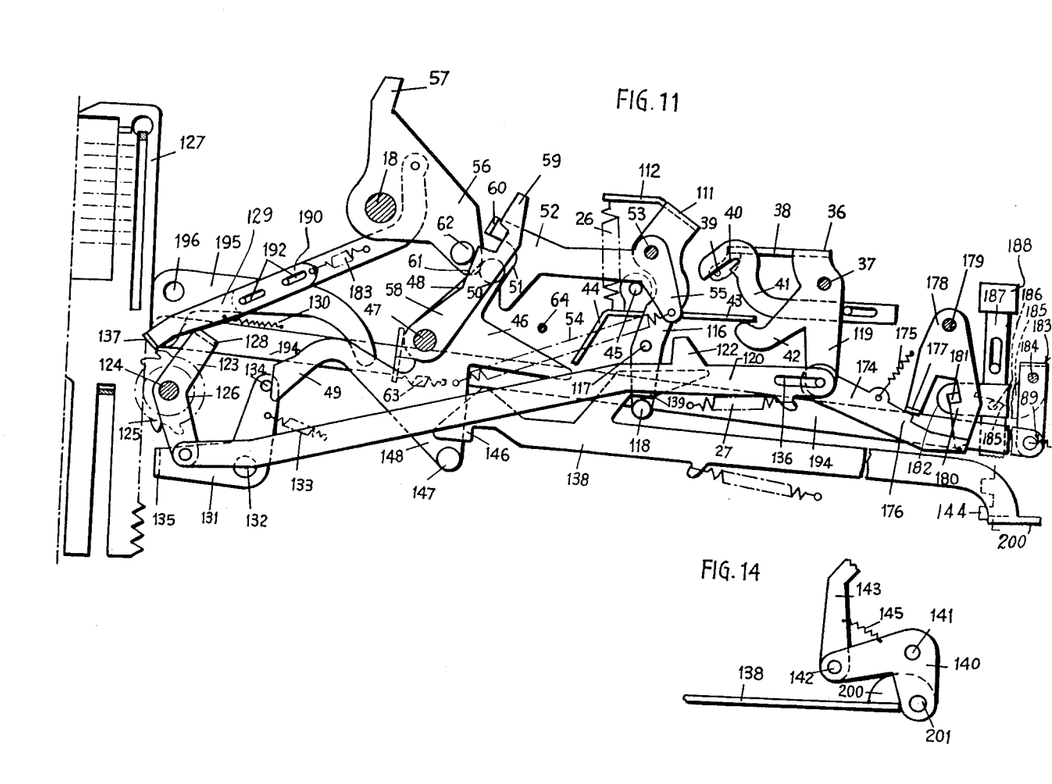
Fig. 11 is a sectional left hand elevation of the machine, showing the division mechanism.
Fig. 14 is a fragmentary plan view of a portion of Figure 11.

Normally the plate 46 and the levers 52 and 58 are urged by their respective springs 54 and 63 into the positions shown in Fig. 11. In these positions the roller 50 of plate 46 rests on the cam 56; the edge 51 of lever 52 rests on the roller 50 and the edge 61 of the lever 58 rests on the stud 62. Starting the clockwise rotation of the main shaft 18, the cam 56 clears the roller 50 so that the plate 46, not being deterred by the arm 44, can rotate counter-clockwise until arrested by the stud 64 secured to the frame of the machine. The lever 52 follows with its edge 51 the movement of the roller 50, rotating clockwise. At the same time the lever 58 follows with its edge 61 the movement of stud 62, rotating counter-clockwise, until arrested by the bent-over lug 60. Near the end of the forward stroke of cam 56 the plate 46 rests on the stud 64, the lever 52, depending on the action of parts described hereinafter, occupies an intermediate position between the normal one shown in Fig. 11 and that which it would occupy, if the edge 51 would still rest on roller 50, and the lever 58 rests on the lug 60. In continuing its clockwise rotation the finger 57 of cam 56 engages the lug 60 and pushes the lever 52 counter-clockwise, permitting a further counter-clockwise rotation of lever 58 until it locks the lug 60. At the beginning of the return stroke of cam 56 the finger 57 clears the lug 60, which is still locked by finger 59. Towards the end of the return stroke the cam 56 contacts the roller 50, causing the plate 46 to swing clockwise, while the stud 62, pressing against the edge 61 of lever 58 causes the clockwise rotation of the latter, which unlocks the lug 60. The lever 52 is now free to rotate clockwise and contacts immediately the roller 50, returning to its position of rest (Fig. 11).

At the end of the return stroke the plate 46 and the levers 52 and 58 again occupy their initial position. Therefore, after having set the division key and having thus disconnected the lever 44 the plate 46 and the lever 52 rock during each cycle of the main shaft 18; however, the width of the stroke of the lever 52 depends on parts which will be described hereinafter.

Figures 12, 15:
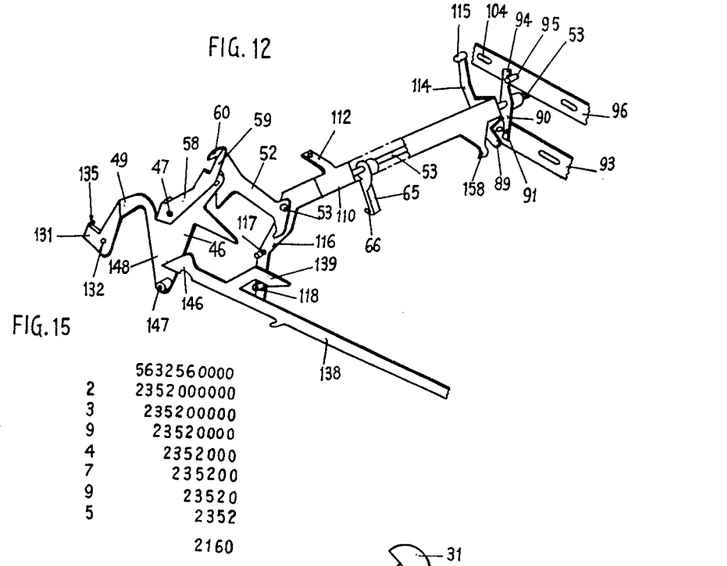
Fig. 12 is a perspective view of a part of the division mechanism.
Fig. 15 shows a sample printing of the problem 563256: 2352 as it appears upon the tape.

A plate 65 is mounted fast on the shaft 53 (Figs. 9 and 12) and in a way to be described hereinafter, senses the state of the register, that is, the sign of the number contained therein and thus varies the extent of the stroke of shaft 53. For a better understanding the function of the transfer mechanism will be described first.

Figures 2, 3:
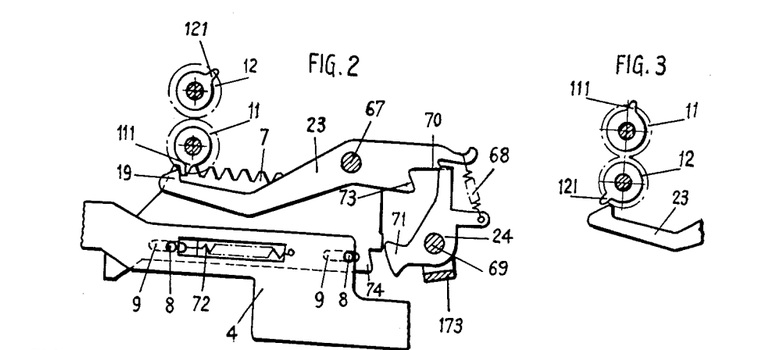

Fig. 2 shows the wheels 11 and 12, having ten teeth each, of any intermediate order of the register. The transfer teeth 111 and 121 correspond to position zero of the adding wheels and subtracting wheels, respectively. In Fig. 2 the adding wheels 11 are in mesh with the racks 7, in Fig. 3 the substracting wheels 12 are in position to mesh with the same, the register having been reversed with a rotation of 180 degrees. Keeping in mind that during the add and subtract cycles the actuating stroke of racks 7, in which they are in mesh with the register, occurs when moving from left to right (Fig. 1 and 2), it will be seen that during an add cycle the transfer tooth 111 depresses the tooth 19 of the pawl 23 when the adding wheel turns counter-clockwise from "nine" to "zero." Similarly, during a subtract cycle the transfer tooth 121 depresses tooth 19 when the subtracting wheel 12 turns counter-clockwise from "zero" to "nine." In both cases the pawl 23 is caused to rotate counter-clockwise about the shaft 67, tensioning the spring 68, stretched between the right hand end of pawl 23 and a projecting ear of a bell-crank lever 24. The latter is pivoted at 69 and has an upper arm pressed against the tooth 70 of lever 23 and a lower projection 71 positioned to arrest the rack 7 meshing with the wheel of the next higher order at the end of the return stroke of the rack. Therefore the latter is prevented from moving further towards the right under the action of spring 72, which connects it with the corresponding rack 4. For the wheels of the highest order the bell-crank lever 24 affects the rack 7 of the unit order as will be described hereinafter.

During the counter-clockwise rotation of lever 23 (Fig. 2) the tooth 70 disengages the lever 24, which, being urged by the spring 68, also rotates counter-clockwise until arrested by the lower tooth 73. In this way the rack 7 is permitted to move towards the right until its projection 74 contacts the projection 71. Thus the rack has advanced one step and this advancement is transmitted to the wheel of the next higher order.

Figure 5:
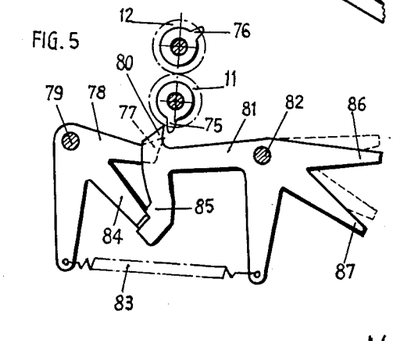
Fig. 5 is a fragmentary view of the means controlled by the register wheels of the highest denominational order.
Figure 6:
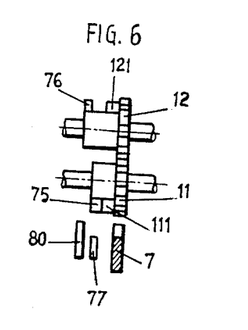
Fig. 6 is a fragmentary view of the register wheels of the highest denominational order.

The wheels of the highest order (Figs. 5 and 6) in addition to the transfer teeth 111 and 121 have similar radially projecting overdraft control teeth 75 (on the adding wheel) and 76 (on the subtracting wheel), which are in alignment with the teeth 111 and 121 respectively, but disposed in different vertical planes (see Fig. 6 where the register is out of mesh of the racks 7).

In front of the tooth 75 is the tooth 77 (Figs. 5 and 6) of the lever 78 pivoted at 79. Similarly in front of the tooth 76 is the tooth 80 of lever 81 pivoted at 82. In Fig. 6 the teeth 77 and 80 are shown schematically. The two levers 78 and 81 are mutually connected by the spring 83 and their mutual position is determined by the pawl 84, adapted to mesh with either of the detent notches 85 of the lever 81.

After a positive total the two levers 78 and 81 occupy the position shown in Fig. 5. The arms 86 and 87 of lever 81 occupy the positions there shown with a continued line. When during a subtraction from the minuend, contained in the register, a larger subtrahend is subtracted, the tens carry-over extends to the orders higher than the highest order of the minuend, up to the wheel 12 of the highest order.

The tooth 76 of the wheel then depresses the tooth 80 of lever 81, swinging the latter counter-clockwise and causing the pawl 84 to snap from the lower notch to the upper notch 85. Therefore, the arms 86 and 87 occupy the new positions shown in dotted lines in Fig. 5 and the tooth 77 comes into the path of the tooth 75. If now to the negative number, contained in the register, a larger addend is added, the tooth 75 of the wheel of the highest order, due to the extended tens carry-over, which occurs during the add cycle, depresses the tooth 77 of lever 78 and causes the pawl 84 to snap from the upper notch to the lower. The parts, including arms 86 and 87, take up their initial position, shown in Fig. 5 by a continued line.

It will be evident from the description given thus far, that the arms 86 and 87 are adapted to occup two different positions, corresponding to the positive or negative sign of the number contained in the register. The arm 87 can then serve to select automatically, in taking a total, the set of wheels, which contains the true balance and which must be brought into mesh with the actuating racks. The corresponding mechanism is well known in the art and need not be described herein.

The arm 86 is similarly utilized in the present invention as an index to the sign of the number contained in the register and to condition consequently, at the beginning of every cycle, the functions which must be accomplished during the cycle.

Figure 9:
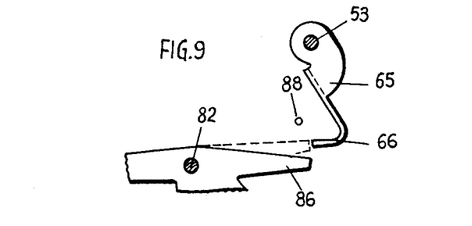
Fig. 9 is a fragmentary left hand view of the means sensing the position of the parts which serve as an index to the sign of the total contained by the register.

More particularly, with reference to Fig. 9, the position of arm 86 is sensed by the apex 66 of the plate 65. As in Fig. 5, also in Fig. 9 the part 86 is drawn in continued line in the position corresponding to a positive balance and in dotted line for the contrary position. It is thus evident that in the first case the apex 66 is free to rotate clockwise until arrested by the stud 88, while in the second case it is arrested by the arm 86.

Fast on the shaft 53 (Figs. 10 and 12) is mounted a double-armed lever 90, one arm of which is adapted to push the stud 92, secured to the subtraction control link 93, and the other arm 94 is adapted to push the stud 95, secured to the printing mechanism control link 96.

Due to the pin and slot connections 97—98, the link 93 (Fig. 10) can slide lengthwise and move into two positions—a right hand inactive one and a left hand active one. The spring 99 urges the link 93 into its right hand end position.

When, upon depression of the subtraction key, not shown in the drawings, or by the clockwise rotation of shaft 53 and hence of lever 90, the link 93 is shifted to the left at the start of a machine cycle, the reversing mechanism of the register is operated in a way that during the return stroke the subtracting wheels 12 are moved into mesh with the racks 7 (Figs. 1 and 3). The means which connect the link 93 with said reversing mechanism are well known, for example, from United States Patent No. 2,059,252 and need not be herein described. It is sufficient to remember that a pinion 100 is mounted fast on the shaft 13 (Fig. 8) of the register group which meshes with the rack segment 101, pivoted at 102. When the subtraction link 93 is shifted in the described manner the rack segment 101 leaves the position shown in Fig. 8 as a continuous line and swings about the pivot 102 counter-clockwise, taking up the position drawn with the dotted line. The pinion 100 and the shaft 13 are thus rotated through 180 degrees and consequently the register group leaves the position of addition and takes up that of subtraction. The whole mechanism stays in the new position until the next cycle starts. If this one is again a subtraction cycle, the mechanism, already set for subtraction, stays there during another cycle. If, on the other hand, the subtraction link 93 remains in its inactive position, the mechanism is set again for addition. The result is, that in case of an uninterrupted sequence of subtracting cycles the register stays in the same position for the whole duration of said sequence.

Figures 8, 10:
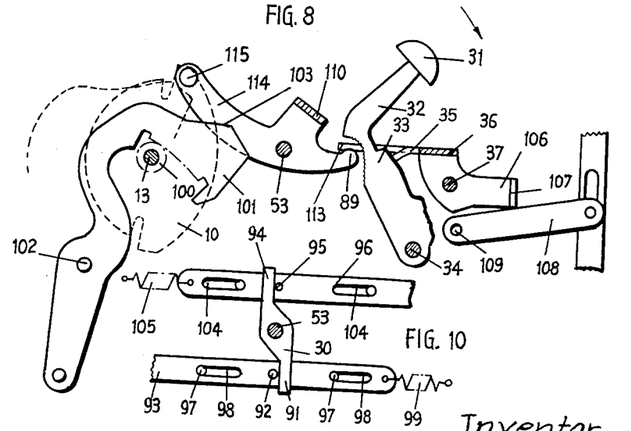
Fig. 8 is a left hand view of mechanism controlled by the division key.
Fig. 10 is a fragmentary left hand view of the means controlling the subtraction and the printing mechanism.

As for the printing mechanism control link 96 (Fig. 10) its function is known in the art for example, from United States Patent 1,120,746 and it is sufficient to remember, that, according to its position, it permits or prevents the releasing of the hammers 16 (Fig. 1) by their restoring bail 17 and the advancement of the platen 14. In Fig. 10 it is to be seen that the link 96 is adapted to slide lengthwise and take up the two positions, a right hand one and a left hand one, limited by the slots 104. In its left hand position, in which it is held by the spring 105, the link 96 enables the printing mechanism to operate, whilst in its right hand position, the latter is disabled.

Therefore, the clockwise rotation of lever 94 shifts the link 96 into its right hand non print position.

After having entered the dividend into the register and set the divisor on the keyboard, upon depression of the division key 1 (Fig. 8) the first cycle of the main shaft 13 (Fig. 1) is started. The dividend entered into the register being positive, the arm 86 (Fig. 9) is not in the path of the apex 66 of plate 65, so that the latter can rotate clockwise, permitting the rotation of shaft 53. The arm 91 of the double-armed lever 90 (Fig. 10) shifts the subtraction link 93 to the left and the arm 94 shifts likewise the printing mechanism control link 96 to the right. The register is immediately set for subtraction and the printing mechanism is disabled. The machine works in this position until, the divisor having been repeatedly subtracted from the dividend, the register is overdrafted and the number contained in the register becomes negative, so that the arm 86 is moved into the path of the apex 66. At the start of the next following cycle the shaft 53 is prevented from rotating and the two arms of the lever 90 do not move either the subtraction link 93 or the printing mechanism control link 96. Therefore, this cycle is an add cycle and the divisor is printed in a known way and the quotient in the way described hereinafter.

The bail 36 is provided with an arm 106 (Fig. 8) which during the clockwise rotation of the bail lowers with its lug 107 the lever 108 pivoted at 109 to prevent at the end of every cycle the pin carriage 2 (Fig. 1) from being restored to its position of rest during division. The lever 108 affects the return mechanism of the pin carriage in the same way as does the usual repeat key, well known in the machines of the class described for example from United States Patent 1,371,138 and which is provided to disengage the pin carriage from the means which normally restore it at the end of every cycle.

Therefore, although the repeat key stays materially in position of rest, the lowering of the division key allows the action of those means which are normally controlled by the repeat key. However, during division the pin carriage remains controlled by the step by step return mechanism, which will be described later.

On the shaft 53 is pivoted a bail 110 (Figs. 8, 11, 12), having a projection 89 (Figs. 8 and 12) which rests on the plate 113 projecting from the bail 36 and is held in this position by the spring 26 stretched between the projection 112 and the lever 44 (Fig. 11). The bail 110 has an arm 114 (Fig. 8), upon which is pivoted the roller 115, placed in front of the upper edge of the rack segment 101 which controls the reversing of the register. When the bail 110 occupies its position of rest and the rack segment 101 is set for addition, as shown in Fig. 8, the roller 115 does not contact the upper edge of rack segment 101. Upon depression of the division key 31, the bail 36 turns clockwise, clearing the projection 89 and enabling the bail 110 to rotate counter-clockwise under the action of spring 26. Therefore, the roller 115 comes to rest on the upper edge 103 of the rack segment 101. When the latter rotates counter-clockwise to set the register for subtraction (rack segment 101 shows in dotted lines in Fig. 8) its upper edge 103 pushes the roller 115 and swings the bail 110 clockwise, restoring it to its initial position. The arm 116 (Fig. 11), projecting from the bail 110 and to which studs 117 and 118 are secured, rotates, too, clockwise.

A link 120 is connected to the arm 119 (Fig. 11) projecting from the bail 36 by means of the pin and slot connection 136 and is urged into its left hand end position by the spring 27, tensioned between link 120 and a part of the machine frame. The link 120 has a tooth 122 which is adapted to be engaged by the pin 117 secured to the arm 116 of the bail 110. A bell-crank 123, is pivoted at the left hand end of the link 120 and is supported on shaft 124. Fast on this shaft are mounted the ratchet wheel 125 and the pinion 126; the latter is adapted to raise a special type rack 127 for printing the digits of the quotient. The type rack 127 is located at the left hand side of the typebars 5. The bell crank lever 123 has a bent-over lug 128 adapted to engage the lever 129, urged downwards by the spring 130, and to keep it in its raised position in which the bent-over lug 137 is out of the path of the teeth of the ratchet wheel 125. The lever 129 is placed at the prolongation of lever 190 which is pivoted on cam 56, the two levers being connected together by means of pin and slot connection 192. A strong spring 193 urges the two levers constantly together.

Another bell-crank lever 131 (Fig. 11) pivoted at 132 is urged by spring 133 to rest with its stud 134 on the arm 49 of plate 46. The left hand arm of the bell-crank lever 131 has a bent-over lug 135 which is adapted to engage the teeth of the ratchet wheel 125.

As has been seen, upon depression of the division key 31, the arm 119 on the one hand and the arm 116 on the other hand (Figs. 8 and 11) rotate, the first clockwise and the second counter-clockwise. In this way, the slot 136 of link 120 is cleared, and the stud 117 abuts tooth 122 and therefore, the spring 27 cannot move the link 120. But when the arm 116 again rotates clockwise, its stud 117 releases the tooth 122 and the link 120 can move to the left.

This movement of link 120 causes the clockwise rotation of the bell-crank lever 123 and its lug 128, which kept the lever 129 in its raised position, is lowered, permitting the lever 129 to engage with its lug 137 the teeth of wheel 125. During every cycle of cam 56 the lever 129, which normally acts in unison with lever 190, moves to and fro, causing the wheel 125 to rotate clockwise one step.

At the same time the swinging movement of plate 46, described above, causes, by means of its arm 49 a similar swinging of the bell-crank lever 131 about its pivot 132 so that its lug 135 engages the teeth of the wheel every time the lever 129 has completed the advance of one tooth and moves to the left to catch the next tooth.

It will thus be apparent that the ratchet wheel 125 advances intermittently due to the alternative action of the advancing lug 137 and detent lug 135, causing the type rack to be raised one step every subtract cycle.

The connection between lever 129 and cam 56 becomes flexible when, due to an erroneous manipulation of the machine, the cam 56 tries to raise the rack 127 over its highest position (Nine). Since the wheel 125 could not rotate further, the action of the cam would cause the parts 129 and 190 to yield by virtue of spring 193.

When, during the overdrafting subtract cycle the number contained in the register becomes negative, the rack segment 101 (Fig. 8) at the start of the next cycle rotates clockwise about its pivot 102 and sets the register for addition, as has been seen above. Since the roller 115 is pressed by the spring 26 against the upper edge of the rack segment 101, the bail 110 and its arm 116 are permitted to rotate counter-clockwise.

The stud 117 (Fig. 11) secured to the arm 116 contacts the tooth 122 of link 120, pushing the latter to the right, since the tension of spring 26, which rotates the bail 110, is stronger than that of spring 27, which urges the link 120 leftwards. The movement of the latter to the right causes the counter-clockwise rotation of the bell-crank lever 123, which with its lug 128 raises the lever 129, preventing it from further advancing the wheel 125. During the same add cycle and while lever 120 is still moving forward, before lever 129 is raised, the bell-crank lever 131 is rotated clockwise, engaging with lug 135, the wheel 125, preventing it from rotating.

Since during this add cycle the printing mechanism control link 96 (Fig. 10) has not been moved into its active disabling position, the divisor and the digit of the quotient is printed at the beginning of the return stroke, the latter is equal to the number of steps the type rack 127 (Fig. 11) has been raised less one. The difference between the number of steps the rack has advanced and the digit printed is due to the fact that in every series of subtract cycles, subtraction cycle, namely the overdraft cycle is excessive.

During the return stroke of plate 46 (Fig. 11), after printing has occurred, the bell-crank lever 131 turns counter-clockwise and its lug 135 disengages the wheel 125, permitting it to rotate counter-clockwise, being urged by a suitable spring, and to restore the type rack 127 into its initial position.

As hereinabove mentioned, the rotation of bail 36 caused by the depression of the division key 31 (Fig. 8) disengages the pin carriage 2 (Fig. 1) from the pin carriage restoring means, which normally return it to its position of rest. The pin carriage controlled by the division mechanism, back spaces one step at the end of every add cycle. For this purpose the arm 116 (Fig. 11) projecting from the bail 110 engages by means of its lower pin 118, the lever 138, which is provided with a hook 139. At its right hand end the lever 138 is provided with a bent-over lug 200 which is pivoted at 201 on a bell-crank lever 140 (Fig. 14). The latter is pivoted at 141. A lever 143 is pivoted at 142 on the lever 140 and engages with its upper tooth the escapement rack 144 connected to the pin carriage 2 (not shown in Fig. 14) to back space it one step every time the lever 138 is shifted to the left. For this purpose a spring 145 is stretched between the bell-crank lever 140 and the lever 143. The pin carriage back spacing mechanism is known from United States Patent 1,371,381.

The lever 138 has at its left hand end a hook-shaped part 146 which is adapted to be engaged by the stud 147 secured to the arm 148 of plate 46.

When the machine is set for subtraction the bail 110 rotates clockwise and the stud 118 secured to its arm 116 engages the hook 139 and holds the lever 138 in its upper position, as shown in Fig. 11. In this position the stud 147, which swings together with the plate 46, cannot engage the hook-shaped part 146 of lever 138 and therefore the latter remains still and the pin carriage 2 is not back spaced.

When the rack segment rotates clockwise and sets the register for addition, it causes, as already explained, the counter-clockwise rotation of the bail 110 and its arm 116. The stud 118 disengages the lever 138, which with its hook 146 falls upon the stud 147 during the clockwise forward stroke of the plate 46. During the return stroke of the latter the stud 147 pulls the lever 138 to the left, causing the pin carriage 2 to be back spaced one step. The lowering of the lever 138 is enabled by a suitable play of the pivot connection 201 between lever 138 and 140.

During the following subtract cycle the arm 116 with its stud 118 again rotates clockwise and engages the lever 138, preventing the latter from further back spacing the pin carriage 2.

The machine continues to operate and the pin carriage 2 to be back spaced until the pin 3 (Fig. 1), corresponding to the lowest significant digit of the divisor, comes in front of the rack 4 of the lowest order. This rack, when moving beyond the position "zero" during an add cycle, causes the machine to stop at the end of the same cycle. This device is well known but for a better understanding it will be described here, too.

To the rack 4 of the lowest order is secured a stud 150 (Fig. 7) in front of which is the lower arm of a double-armed lever 151, pivoted at 152 upon the frame of the machine. On the upper arm, at 153, is pivoted a lever 154, having a tooth 155 and being provided with a bent-over lug 156 at its right hand end; the lever 154 is urged counter-clockwise and to the right by the spring 157. The tooth 155 is adapted to be engaged by the apex 158, projecting from the bail 110. The bent-over lug 156 is engageable with the hook-shaped part 159 formed from the bail 197 (Fig. 13), connected to the lever 32 of the division key 31.

Figure 7:
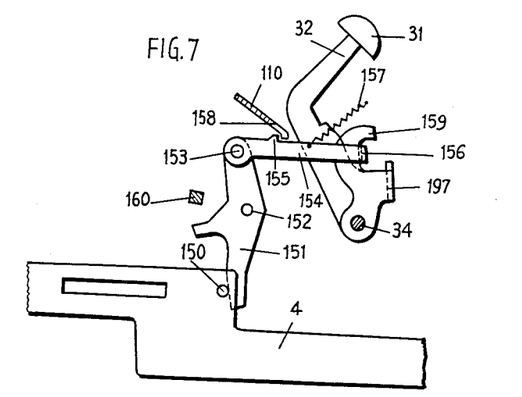
Fig. 7 is a left hand view of means controlling the return of the division key to its position of rest.

When the division key is in normal, unset position and the machine is operated in other than division, and even during the subtract cycles of an operation of division, the bail 110 is rotated clockwise and the apex 158 engages the tooth 155 of lever 154. Therefore, the removal of stud 150 from the lever 151, when the rack 4 of the lowest order moves to the left, is not sufficient to permit the lever 151 to rotate clockwise.

However, when the rack 4 advances beyond the position "zero," during an add cycle in an operation of division, the bail 110 is in its counter-clockwise rotated position, so that the apex 158 has disengaged the tooth 155 of lever 154. Being urged by the spring 157 the double-armed lever 151, when cleared from the stud 150, rotates clockwise, moving the lever 154 to the right, till the lever 151 is arrested by the stud 160. The bent-over lug 156 places itself in front of the upper apex of hook 159. During the return movement from left to right of rack 4 its stud 150 meets the lower arm of the double-armed lever 151, causing its counter-clockwise rotation, so that the lever 154 pulls the hook 159 and the lever 32 of the division key (Fig. 8) releases the lug 35 of bail 36 and the latter returns to its position of rest, moving the lever 41 to the right (Fig. 11) and causing the machine to stop at the end of the cycle.

To advance the lever 154 such an amount to the right to permit its bent-over lug 156 to engage the hook 159, it is necessary and sufficient that the rack 4 of the lowest order advances beyond the "zero" position. The operation of division continues therefore until the significant digit of the lowest order of the divisor comes in front of the rack 7 of the units order.

Now there will be described the means which, upon depression of the division key disable the fugitive one mechanism, permitting the machines upon which the present division mechanism is applied, to print true negative totals during operations which are not of division.

Upon the shaft 34 of lever 32 of the division key (Fig. 13) is pivoted the lever 161, urged by the spring 162 to rest with its edge 198 on the bail 197, which connects the lever 32 with the hook 159. In front of the lower end of the lever 161 is the stud 163, secured to a bell-crank lever 164, pivoted on the shaft 69. As described hereinabove (Fig. 4) all the bell-crank levers 24 are pivoted upon this shaft, including the one actuated by the register wheel of the highest order and connected to the lever 25 of the units order through the bail 165. This lever 25, like the levers 24 is provided with the projection 71 which engages the units order rack 7, but unlike the levers 24 has no upper arm. The bell-crank lever 164 has a bent-over lug 166 adapted to engage the upper edge of the bail 165. Upon depression of the division key 31 the lever 32, rotating clockwise, causes the lever 161, which is urged clockwise by the spring 162, to also rotate, about the pivot 34. The lower end of lever 161 slides upon stud 163, pushing it downwards and thus causing the clockwise rotation of lever 164. The bent-over lug 166 of this lever engages the upper edge of the bail 165, preventing it from rotating counter-clockwise, and thus preventing the rack 7 of the units order from moving to the right.

Figure 13:
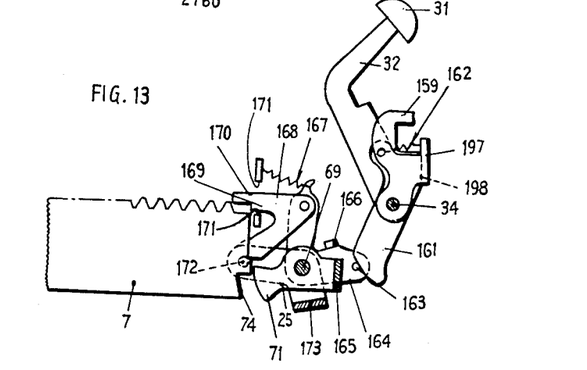
Fig. 13 is a left hand view of parts of the division mechanism which control the fugitive one mechanism.

During the last add cycle the lever 32 is released from the bail 36 and rotates counter-clockwise, rotating the lever 161 counter-clockwise. The latter releases the stud 163 and the bell-crank lever 164 is thus permitted to rotate counter-clockwise, being urged by the spring 167.

However, since the lever 32 returns to its normal unset position before the end of the cycle, a tens carry-over during the last add cycle would occur after lever 164 has returned to an inactive position and thus permit rotation of bail 105 and erroneous fugitive one entry. Consequently the lever 164 must be locked in its lowered position during all the time required for the performance of the tens carry-over.

Figure 4:
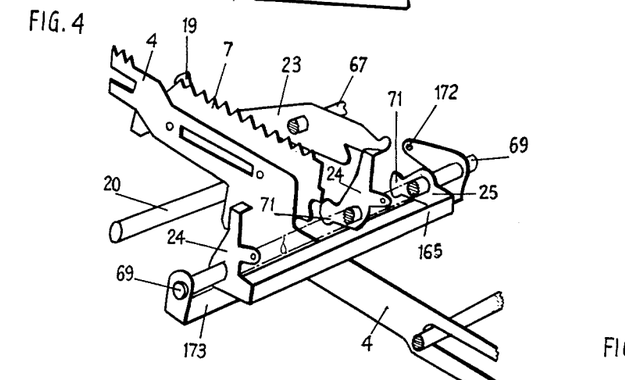
Fig. 4 is a perspective view of the tens carry-over mechanism and of the fugitive one mechanism.

For this purpose a lever 168 is pivoted upon the bell-crank lever 164, and has an upper arm formed with two steps 169 and 170, sliding in an opening 171, and a lower arm abuts stud 172 secured to an arm of the bail bar 173 (see also Fig. 4). The latter is pivoted upon shaft 69 and engaging the projection 71 of all the levers 24 serves to restore (Fig. 2) the levers 24 which have rotated counter-clockwise for the tens carry-over. The bar 173 is restored into its initial position at the beginning of every cycle, as known in the art.

When, owing to the clockwise rotation of lever 161, the stud 163 is lowered, the lever 164 rotates clockwise and the lower step 169 leaves the lower edge of the opening 171, on which the upper step 170 comes to rest.

The clockwise rotation of the bar 173, which occurs at the start of every cycle, causes the stud 172 to engage the lower arm of lever 168 and to rotate the latter clockwise. However, since the lever 32 is restored to its normal, unset position, disengaging the stud 163, subsequently in the cycle the lever 164 is not permitted to rotate counter-clockwise and to release the bail 165, because step 169 of lever 168 is arrested by the lower edge of the opening 171.

During the first cycle following the operation of division, the swinging of the bar 173 causes the clockwise rotation of lever 168 and its lower step 169 can this time pass through the opening 171, permitting the lever 164 to be returned to its position of rest by the spring 167 and to release the bail 165.

If, before starting an operation of division, a fugitive one transmission had occurred, the lever 25 of the units order would have its projection 71 in front of the projection 74 of the corresponding rack 7. In this case the rack 7 prevents the clockwise rotation of lever 25, and also of lever 164. If the connection between the levers 32 and 161 would be rigid, it would be impossible to depress the division key 31.

For this reason a flexible connection between the levers 32 and 161 is provided. Upon depression of the division key 31, the lever 32 rotates in the usual way and tensions the spring 162, whereas the lever 161 does not function. This lever rotates clockwise as soon as the bar 173 has rotated the lever 25 clockwise, permitting thus the clockwise rotation of lever 164.

In the present example the machine stops after the correcting add cycle following the last series of subtract cycles. To zeroise the register and to obtain the remainder it is then necessary to depress the total key. The performance of this operation can be obtained automatically in this invention as well as in known division machines. Said automatic performance can be obtained with the division mechanism of the present invention and there will be described hereinafter the means which depress the total key and prevent the motor from stopping upon the return of the division key to its position of rest.

A lever 174 (Fig. 11) is pivoted on arm 119 of bail 36, and is urged counter-clockwise by a spring 175 and provided with a step 176. In the position of rest of arm 119, the step 176 will be under the bent-over lug 177 of a plate 178, which is pivoted at 179 on the frame of the machine and is provided with a finger 180. The latter engages the square-formed stud 181 secured to the arm 182 of a bail 183 pivoted at 184 on the frame of the machine and provided with a second arm 185. The latter is adapted to engage the stud 186, secured to the bar 187 of the total key 188, known in the art. A spring not shown urges the bail 183 to rotate counter-clockwise to cause, by means of the arm 185, the depression of the total key 188. This counter-clockwise rotation is normally prevented by the finger 180 which engages the stud 181.

Upon depression of the division key 31, the bail 36 rotates clockwise and the step 176 of lever 174 places itself at the left of the bent-over lug 177 without moving the plate 178. When at the end of an operation of division the bail 36 returns to its position of rest, rotating counter-clockwise, the lever 174 is pushed to the right, pushing at the same time the lug 177 into the same direction. With the counter-clockwise rotation of plate 178 taking place in this way, the finger 180 releases the stud 181, permitting the bail 183 to rotate counter-clockwise, being urged by the spring 189. This causes the depression of the total key and the accomplishment of the relative operation.

A link 194 provided to tension the spring 189 and to return the bail 183 into its normal position, is pivoted on the bell-crank lever 195, which is pivoted at 196 on the frame of the machine. A roller applied to cam 56 opposite of roller 62 engages at every cycle the lever 195, giving it a greater or smaller stroke, depending on the position of bail 183, which can be rotated counter-clockwise or occupy the position shown in Fig. 11. In the first case the stud 181 is re-engaged by finger 180 and the parts resume their initial position.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinafter claimed.

What I claim is:
1. In an adding and subtracting machine having a register comprising two sets of intermeshed wheels arranged in denominational orders, said register being capable of representing positive and negative amounts and being reversible for addition and subtraction, and a fugitive one mechanism for entering one unit into the lowest order wheels under the control of the highest order wheels, a transfer tooth being carried by each wheel of the highest order for controlling said fugitive one mechanism, the combination of an index member capable of assuming either of two positions as an incident to a change in the character of said amounts for indicating said character, a control device capable of sensing said index member for conditioning machine functions, and a cam element carried by each one of the wheels of the highest order for controlling said index member, said cam elements being located in different planes to alternately cooperate with said index member upon reversing said register.

2. In a machine according to claim 1, a positioning member engageable by one of said cam elements and cooperating with said index member for positioning the latter, said index member being engageable by the other cam element, whereby said positioning member and said index member are alternately engageable by the respective cam elements upon reversing said register.

3. In an adding and subtracting machine having a register comprising a plurality of denominational orders, a set of normally locked spring actuated actuators for said register, a fugitive one mechanism for entering one unit into the lowest order, said mechanism comprising a spring actuated release member controlled by the highest order for releasing the actuator of the lowest order for entering said unit, means for initiating a division operation, and means operable by said initiating means for preventing actuation of said release member.

4. In an adding and subtracting machine having a register comprising a plurality of denominational orders, a set of normally locked spring actuated actuators for said register, transfer trip members, restoring means operated substantially at the beginning of each machine cycle for restoring said transfer trip members, a fugitive one mechanism for entering the unit into the lowest order, said mechanism comprising a release member controlled by the highest order for releasing the actuator of the lowest order for entering said unit, means operable for initiating a division operation, said means remaining operated substantially until termination of division, means effective during operation of said initiating means for locking said release member, means for latching said locking means in operated position, and means effective upon operation of said restoring means for unlatching said locking means.

5. In an adding and subtracting machine having a register comprising a plurality of denominational orders, a set of normally locked spring actuated actuators for said register, a fugitive one mechanism for entering one unit into the lowest order, said mechanism comprising a release member controlled by the highest order for releasing the actuator of the lowest order for entering said unit, said release member being movable from a normal position to an actuated position, restoring means operated substantially at the beginning of each machine cycle for restoring said release member to normal position, means operable for initiating a division operation, means associated with said initiating means for positively engaging said release member upon operation of said initiating means, and resilient means interposed between said initiating and said engaging means, said resilient means permitting operation of said initiating means before restoration of said release member.

(References on following page)

References Cited in the file of this patent

UNITED STATES PATENTS

| | | | |
|---|---|---|---|
| Re. 22,947 | Clary | Dec. 9, | 1947 |
| 2,203,336 | Landsiedel | June 4, | 1940 |
| 2,237,881 | Landsiedel | Apr. 8, | 1941 |
| 2,251,097 | Anderson | July 29, | 1941 |
| 2,251,099 | Anderson | July 29, | 1941 |
| 2,255,622 | Landsiedel | Sept. 9, | 1941 |
| 2,297,243 | Pott | Sept. 2, | 1942 |
| 2,330,689 | Crosman | Sept. 28, | 1943 |
| 2,339,616 | Chase | Jan. 18, | 1944 |
| 2,397,745 | Kiel | Apr. 2, | 1946 |
| 2,417,563 | Moses | Mar. 18, | 1947 |
| 2,695,134 | Sunstrand | Nov. 23, | 1954 |